Jan. 24, 1967  F. N. CLARK  3,299,915
APPARATUS FOR THE SANITARY AND EFFICIENT TRANSFER OF MILK
Filed April 13, 1964
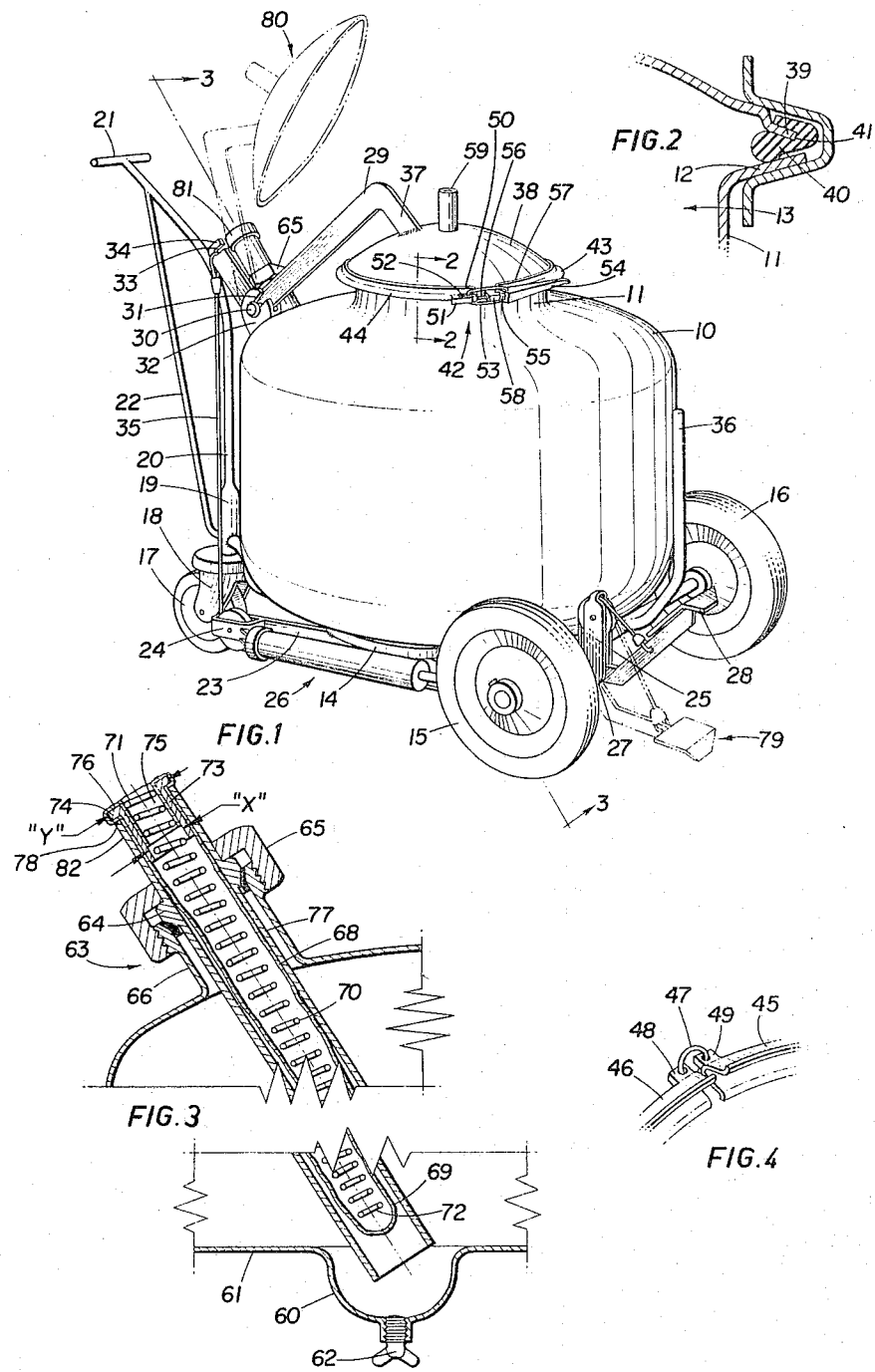
Inventor
FRANK NELSON CLARK
by: *Cavanagh & Norman*

United States Patent Office 3,299,915
Patented Jan. 24, 1967

3,299,915
APPARATUS FOR THE SANITARY AND EFFICIENT TRANSFER OF MILK
Frank Nelson Clark, 2 Eastpark Blvd., Scarborough, Ontario, Canada
Filed Apr. 13, 1964, Ser. No. 359,217
4 Claims. (Cl. 141—231)

This invention relates to improved apparatus for the sanitary and efficient transfer of milk from cow to storage tank.

Apparatus presently available for transferring milk from cow to storage tank include pipeline systems, both of the overhead and underground type. The investment in equipment of this nature is, of course, considerable and is such as to prohibit, virtually, its installation by any dairy farming concern save only those being operated on a fairly large scale. In addition to the magnitude of the capital investment involved, however, it has been found that existing systems are both difficult and costly to maintain and to repair, particularly in the case of underground pipeline systems. It will also be appreciated that, where a dairy farm is to be enlarged, it would be necessary, in most instances, to install further pipeline equipment, thereby increasing an already substantial capital expenditure, rather than merely modifying or extending the existing pipeline facilities.

Moreover, the systems presently available do not, in general, provide means for the inspection of the milk from a particular cow or cows, either visually or by taste and smell, before this milk is transferred to the storage tank and mixed with the milk of other cows. In most cases, an automatic milker, connected to the pipeline system, by for example, a hose attachment or other suitable means, is simply attached to the udder of the cow being milked, and the milk then passes directly into the pipeline system and, ultimately, pours into a storage tank. Subsequently, this milk is poured into receptacles suitable for shipment to distributors.

Accordingly, there is an everpresent danger that milk which would otherwise be substantially free from impurities may become tainted through, for example, admixture with uninspected milk taken from a diseased cow. Moreover, once the milk from a great number of cows has been mixed, it is, of course, most difficult to detect any impurities and foreign matter therein, and similarly, assuming that such are found, very difficult to remove with convenience or, more importantly, with any degree of confidence that the removal has been thorough and complete.

It is, accordingly, an important object of the present invention to provide apparatus for the transfer of milk from cow to storage tank which enables the inspection of milk taken from each cow prior to admixture thereof with other milk.

It is a further important object of the present invention to provide apparatus for the transfer of milk from cow to storage tank which is characterized by simplicity and reliability of construction and which achieves substantial advantages over present systems both from the point of view of capital investment and of maintenance costs.

It has been found that the foregoing and other objects of the present invention are achieved, and the disadvantages and shortcomings inherent in prior systems overcome, by the provision of a novel vessel for the preliminary storage of milk which is of a size permitting convenient transportation about a dairy barn. As will be described with reference to the accompanying drawings, the vessel of the invention is provided with a retractable closure device which is adapted to achieve the substantially hermetic sealing of the opening of the vessel into which the milk is poured. Inlet structure, communicating with the interior of the vessel and adapted for connection with a source of pressure is also provided, together with means for communicating the interior of the vessel with a storage receptacle.

A more complete understanding of the present invention will be obtained and further objects and advantages thereof become apparent from a consideration of the following detailed description of the construction and operation of a preferred embodiment of the invention with reference to the accompanying drawings, in which like reference numerals refer to like elements throughout and in which:

FIGURE 1 is a perspective view of the vessel of the invention, and component parts;

FIGURE 2 is a sectional view on lines 2—2 of FIGURE 1;

FIGURE 3 is a sectional view on lines 3—3 of FIGURE 1; and

FIGURE 4 is a view showing the linkage of the clamp member of the invention.

Referring now to FIGURE 1, the numeral 10 refers to the vessel of the invention, which is preferably of jug-like configuration, as shown, and embodies a neck portion 11 surmounted by a peripheral lip structure 12, defining an opening 13 of vessel 10, as indicated in FIGURE 2.

As shown in FIGURE 1, a support structure 14 is provided for vessel 10. In the illustrated embodiment, support structure 14 is an essentially triangularly shaped frame assembly carrying rear wheels 15 and 16 and a front wheel 17. It will be appreciated, however, that other transportable support means for vessel 10 may be used without departing from the scope of the present invention.

To provide maneuverability, front wheel bracket 18 is pivotally mounted in mounting 19 of steering column 20 for rotation about the longitudinal axis of the latter. Also, a handle 21 may conveniently be provided at the topmost end of steering column 20. The latter may also be provided with a reinforcing bar 22.

Rigidly secured to support structure 14 is a laterally extending member 23 which carries bracket members 24 and 25 and a third bracket member, located behind wheel member 15, each of which rotatably supports a pulley member, as shown.

Mounted on member 23 intermediate of bracket member 24 and the third bracket member is a piston-and-cylinder assembly 26 of well-known construction. Pivotally mounted at the heel 27 of member 23 is a foot pedal 28.

Pivotally mounted on vessel 10 at one side thereof is a lever member 29 which is provided, intermediate of its ends, with a pin 30. Pin 30 is seated within slot 31 of bracket member 32, which is mounted on the surface of vessel 10.

A slot 33 is provided adjacent end 34 of lever member 29 for the accommodation therein of one end of a cable 35. As shown, cable 35 communicates, by means of the pulley members pivotally supported by bracket members 24, 25 and the third bracket, and by means of piston-and-cylinder assembly 26, with foot pedal 28.

Support structure 14 may be conveniently provided, intermediate of rear wheels 15 and 16, with an upright support bar 36, which balances and supports the entire assembly when it is tipped on its side for washing or other like maintenance operation.

Depending from the other end 37 of lever member 29 is the retractable closure means 38 of the invention, which is preferably of generally cap-like construction, as shown, and which has a peripheral bearing surface 39 of a configuration and size permitting same to be seated upon peripheral lip structure 12 of neck portion 11, when closure means 38 is disposed in its normal overlying relationship with opening 13 of vessel 10.

Closure means 38 is preferably provided with a gasket member 40 which may be of rubber or other suitable resilient material, and which is adapted to fit over and substantially to enclose the outer edge 41 of bearing surface 39.

In order to achieve the substantially hermetic sealing of opening 13 by closure means 38, a clamp member 42 is provided, which is of a cross-sectional configuration substantially corresponding to the combined configuration of bearing surface 39, gasket 40 and lip structure 12.

Clamp member 42 preferably comprises a pair of substantially semi-circular members 43 and 44 which may be conveniently linked at their respective ends 45 and 46 by means of a ring member 47 passing through eye members 48, 49. Member 44, adjacent its other end 50 is provided with a shoulder portion 51 integrally formed therewith and embodying an elongated slot 52 therein, which accommodates a link 53. Pivotally depending from link 53 is a tightening lever 54 which embodies an aperture 55.

Shoulder portion 51 may also be conveniently provided with an adjusting bolt-and-screw assembly 56, the purpose of which will become apparent hereinafter.

Member 43 is provided, adjacent its other end 57, with a hook portion 58 integrally formed therewith and adapted to accommodate the end of tightening lever 54 adjacent aperture 55 therein, when lever 54 is urged to the tightening position shown in FIGURE 1.

Vessel 10 is also provided with inlet nozzle means 59 of generally tubular construction and communicating with the interior of vessel 10. Nozzle means 59 may conveniently be formed integrally with closure means 38 and disposed substantially centrally thereof, as shown.

To facilitate the draining and cleaning of vessel 10, a well portion 60 is provided in base portion 61 thereof as shown in FIGURE 3, and is preferably disposed substantially centrally of said portion 61 in order to take advantage of the configuration of the latter, which is preferably concave, as shown in FIGURE 1. A stopper assembly 62 is provided for well portion 60, which achieves a substantially leakproof seal therefor.

The numeral 63 designates the outlet structure of the invention, which communicates with the interior of vessel 10 and is preferably of generally tubular construction, as shown. Outlet structure 63 is provided intermediate of its ends, with a joint 64 for the convenient assembly thereof with vessel 10 by means of lock nut 65, which is threaded onto support structure 66. Gasket means 67 are provided intermediate of joint 64 and support structure 66.

According to a presently preferred embodiment of the invention, filter means 68 are provided within outlet structure 63, as shown in FIGURE 3, which may conveniently consist of an elongated bag member 69 of an absorbent cloth or flannel material having one open end and which is of a size sufficient to enclose and be supported by a spiralwire member 70, which preferably tapers gradually in diameter between the upper end 71 and the lower end 72 thereof, as shown in FIGURE 3. Adjacent the upper end 71 of spiral member 70, a rubber stopper 73, of generally tubular structure, and having a flange portion 74 integrally formed therewith, is secured in the following manner: the stopper 73, with flange portion 74 uppermost, is inserted into bag member 69, and portions of the latter are folded into passage 75 of stopper 73 over a portion of the length thereof; spiral member 70 is then inserted, through passage 75 of stopper 73, into bag member 69 until the upper surface 76 of flange member 74 is substantially adjacent the upper end 71 of spiral member 70 and the lower end 72 of the latter is adjacent the closed end of bag member 69.

The diameter "X" of stopper 73 is such that when filter means 68 are installed in outlet structure 63, a tight fit is achieved between the inner surface of outlet structure 63 and the outer surface of stopper 73 with portions of bag member 69 interposed therebetween. Flange member 74 is of an outer diameter "Y" corresponding substantially to that of tubing 77 and bears upon the upper peripheral surface 78 of outlet structure 63 when the filter means 68 is installed therein.

In operation, the vessel 10 is wheeled from stall to stall in the dairy barn. Having inspected the milk taken from a particular cow, and assuming that it meets his approval the operator will depress foot pedal 25 to position 79, shown in dotted line, thereby causing closure means 38 to be lifted from its normally overlying position with reference to opening 13 to position 80, shown in dotted line, and pour the milk into vessel 10. Having completed the pouring, the operator will release pedal 25, and closure means 38, by virtue of the cushioning effect provided by assembly 26, will slowly return to its normal position. The operator will then proceed to wheel vessel 10 to the next stall and the same operation is repeated.

During this time, of course, clamp member 42 will not be in the engaged position shown in FIGURE 1. Also, a cap 81 of plastic or rubber material and of an inner diameter enabling the same to overlie and to enclose flange member 74 and the end 82 of outlet structure 63, may conveniently be provided.

Once vessel 10 has been filled with milk, the operator will wheel it into proximity with a storage tank (not shown). At this point, inlet nozzle means 59 will be connected by, for example, rubber tubing (not shown) to an air compressor (not shown). Also, cap 81 is removed from the end 82 of outlet structure 63 and outlet structure 63 is connected, in a similar manner, to the inlet of the storage tank (not shown). Clamp member 42 is then brought into position enclosing bearing surface 39, gasket 40 and lip structure 12, and tightening lever 54 is urged to the tightening position, thereby substantially hermetically sealing closure means 38 with respect to opening 13 on vessel 10. If desired, the seal thereby established may be tightened or otherwise adjusted by means of assembly 56 on shoulder portion 51.

The air compressor (not shown) may then be turned on and the contents of vessel 10 forced, by means of compressed air, through outlet structure 63 into the storage tank (not shown).

From the foregoing, it will be appreciated that the present invention provides equipment which enables the safe and sanitary transfer of milk from cow to storage receptacle in a convenient and economical manner. Moreover, it will be appreciated that the present invention provides means for the inspection of milk prior to its admixture with other milk. Also, it will be apparent that the present invention enables the enlargement of dairy facilities at reasonable cost and without the necessity of altering or modifying existing milk transfer equipment.

While the present invention has been described, by way of illustration, with reference to what is presently considered to be a preferred embodiment thereof, it will be appreciated by those skilled in the art that various modifications and alterations may be made without departing from the spirit and scope of the invention, as defined by the claims appended hereto.

What I claim is:

1. Apparatus for the transfer of milk comprising in combination; a vessel for the preliminary storage of milk, said vessel embodying an opening therein; support means for said vessel; means on said support means enabling the conveyance of said support means and said vessel; retractable closure means in association with said vessel of a size and configuration enabling said closure means, when disposed in overlying relationship with said opening, completely to cover the latter; a lever member pivotally mounted on said vessel with said closure means depending from one end thereof, said lever member being so mounted that said closure means can be moved to open and closed positions with respect to said opening; actuating means communicating with said lever member and mounted on said support means, said actuating means being operable to cause said lever member and said closure means to be moved relative to said opening to effect said open and closed positions; inlet nozzle means in association with said vessel and communicating with the interior of said vessel, said inlet nozzle means being communicable with a source of pressure; and outlet structure in association with said vessel communicating with the interior thereof and communicable with a storage receptacle.

2. Apparatus for the transfer of milk comprising in combination: a vessel for the preliminary storage of milk, said vessel embodying an opening therein; support means for said vessel; means on said support means enabling the conveyance of said support means and said vessel; retractable closure means in association with said vessel of a size and configuration enabling said closure means, when disposed in overlying relationship with said opening, completely to cover the latter; a lever member pivotally mounted on said vessel with said closure means depending from one end thereof, said lever member being so mounted that said closure means can be moved to open and closed positions with respect to said opening; actuating means communicating with said lever member and mounted on said support means, said actuating means being operable to cause said lever member and said closure means to be moved relative to said opening to effect said open and closed positions; inlet nozzle means in association with said vessel and communicating with the interior of said vessel, said inlet nozzle means being communicable with a source of pressure; outlet structure in association with said vessel communicating with the interior thereof and communicable with a storage receptacle; and filter means in association with said outlet structure adapted to entrap and to retain foreign material in milk prior to the entry thereof into said storage receptacle.

3. Apparatus for the transfer of milk comprising in combination: a vessel for the preliminary storage of milk, said vessel embodying an opening therein; support means for said vessel; means on said support means enabling the conveyance of said support means and said vessel; retractable closure means of generally cap-like construction in association with said vessel of a size and configuration enabling said closure means, when disposed in overlying relationship with said opening, completely to cover the latter; a gasket member formed of a resilient material adapted substantially to enclose the peripheral edge of said closure means; a lever member pivotally mounted on said vessel with said closure means depending from one end thereof, said lever member being so mounted that said closure means can be moved to open and closed positions with respect to said opening; actuating mean communicating with said lever member and mounted on said support means, said actuating means being operable to cause said lever member and said closure means to be moved relative to said opening to effect said open and closed positions; inlet nozzle means in association with said vessel and communicating with the interior of said vessel, said inlet nozzle means being communicable with a source of pressure; and outlet structure in association with said vessel communicating with the interior thereof and communicable with a storage receptacle; and a clamp member adapted to enclose said peripheral edge of said closure means, said gasket member and the periphery of said opening when said closure means is disposed in said overlying relationship therewith, thereby to achieve a substantially hermetic sealing of said opening.

4. Apparatus for the transfer of milk comprising in combination: a vessel for the preliminary storage of milk, said vessel embodying an opening therein; support means for said vessel; means on said support means enabling the conveyance of said support means and said vessel; retractable closure means of generally cap-like construction in association with said vessel of a size and configuration enabling said closure means, when disposed in overlying relationship with said opening, completely to cover the latter; a gasket member formed of a resilient material adapted substantially to enclose the peripheral edge of said closure means; a lever member pivotally mounted on said vessel with said closure means depending from one end thereof, said lever member being so mounted that said closure means can be moved to open and closed positions with respect to said opening; actuating means communicating with said lever member and mounted on said support means, said actuating means being operable to cause said lever member and said closure means to be moved relative to said opening to effect said open and closed positions; inlet nozzle means in association with said vessel and communicating with the interior of said vessel, said inlet nozzle means being communicable with a source of pressure; outlet structure in association with said vessel communicating with the interior thereof and communicable with a storage receptacle; filter means in association with said outlet structure adapted to entrap and to retain foreign material in milk prior to the entry thereof into said storage receptacle; and a clamp member adapted to enclose said peripheral edge of said closure means, said gasket member and the periphery of said opening when said closure means is disposed in said overlying relationship therewith, thereby to achieve a substantially hermetic sealing of said opening.

References Cited by the Examiner

UNITED STATES PATENTS

| | | | |
|---|---|---|---|
| 2,751,123 | 6/1956 | Kuhles et al. | 222—176 |
| 3,195,873 | 7/1965 | Philbrick | 220—36 |

LAVERNE D. GEIGER, *Primary Examiner.*

H. S. BELL, *Assistant Examiner.*